Sept. 4, 1962  B. VER NOOY  3,052,034
CALIPER PIG
Filed June 20, 1960  2 Sheets-Sheet 1
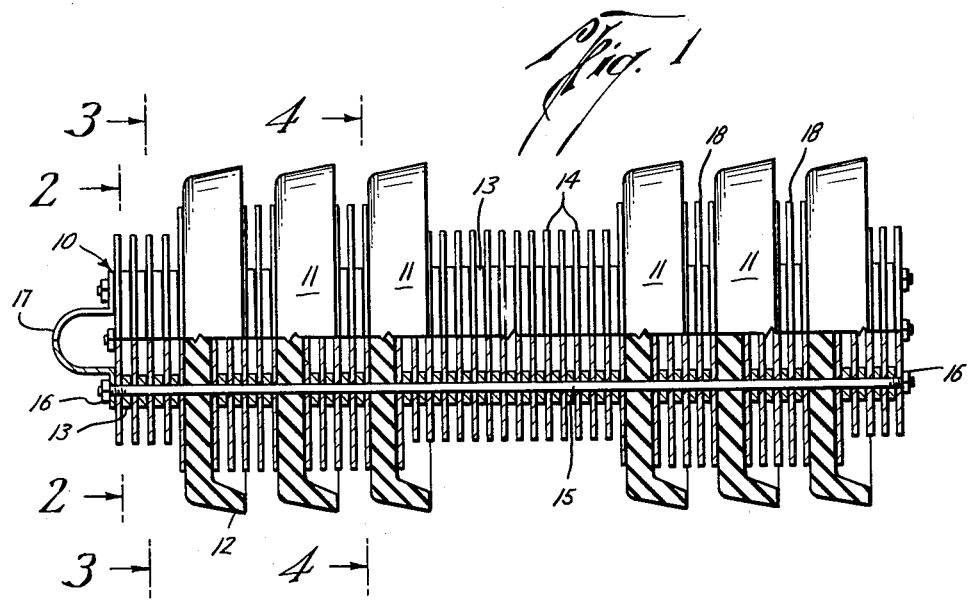
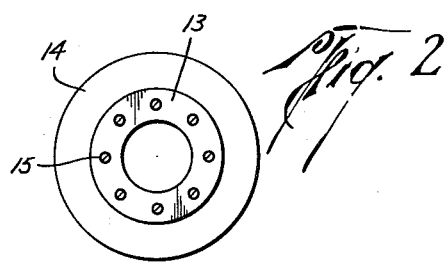
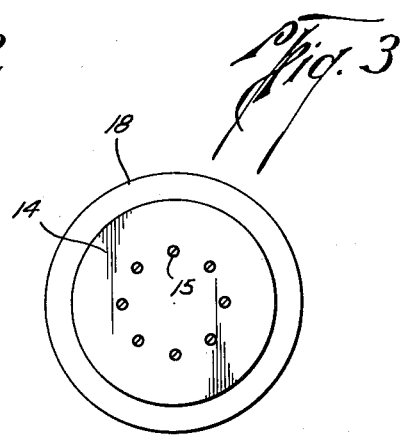
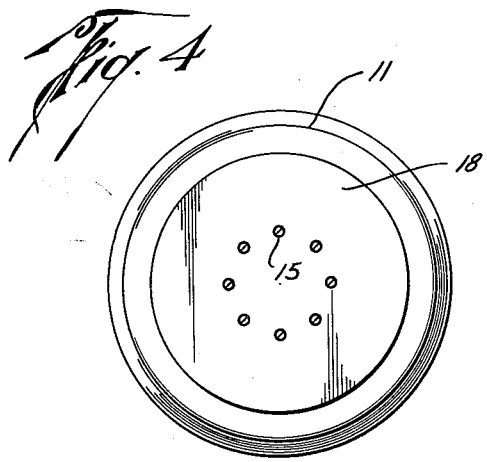
Burton Ver Nooy
INVENTOR.
BY Browning, Simmons
Hyer & Eisenrauht
ATTORNEYS Sept. 4, 1962 B. VER NOOY 3,052,034
CALIPER PIG
Filed June 20, 1960 2 Sheets-Sheet 2
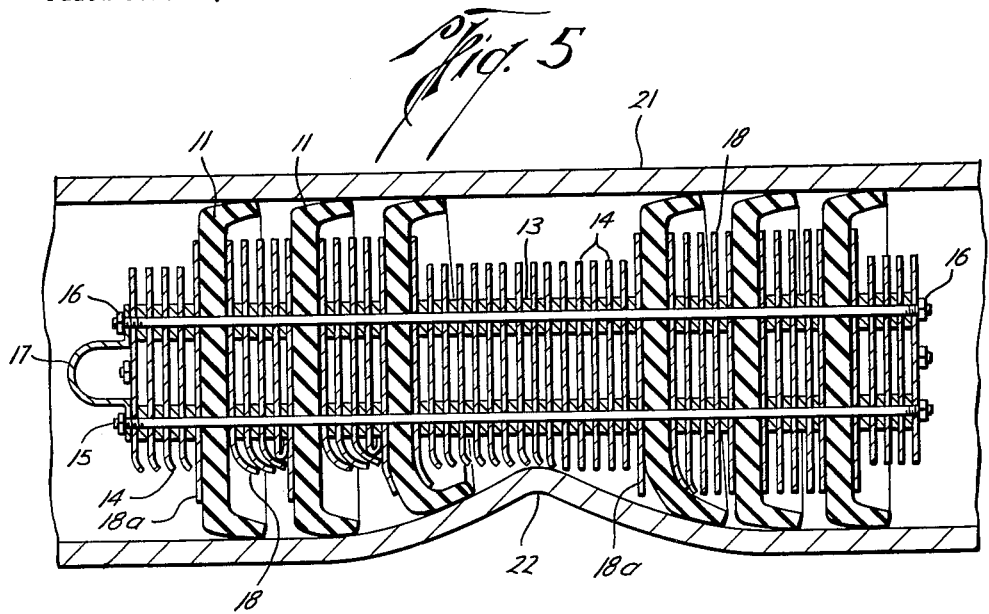
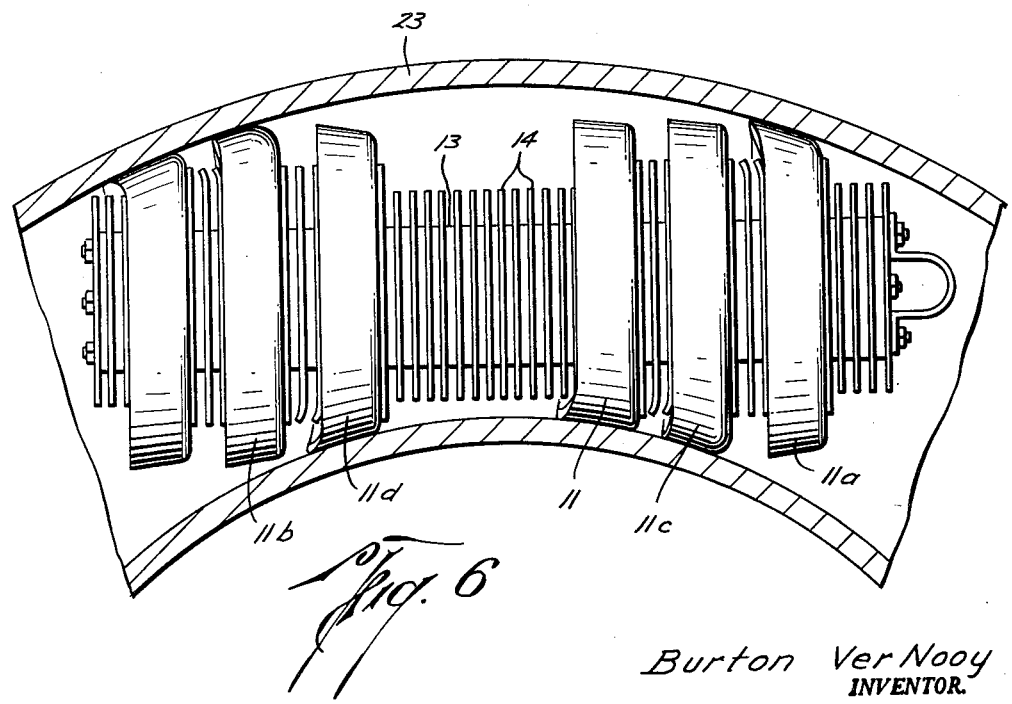
Burton Ver Nooy
INVENTOR.
BY Browning, Simms
Dyer & Eisenrodt.
ATTORNEYS

United States Patent Office 3,052,034
Patented Sept. 4, 1962

3,052,034
CALIPER PIG
Burton Ver Nooy, Tulsa, Okla., assignor to
T. D. Williamson, Inc., Tulsa, Okla.
Filed June 20, 1960, Ser. No. 37,425
12 Claims. (Cl. 33—175)

This invention relates to an improved device for measuring internal cross-sectional areas of pipelines. It is particularly adapted for use with pipelines carrying natural gas or petroleum products and partially obstructed by dents, out-of-round portions, or valves which reduce the available cross section and carrying capacity of the line.

Long pipelines used for transportation of natural gas or petroleum are seldom of uniform cross section throughout their length. These lines have a tendency to become flattened into elliptical cross-sectional shape, especially in locations where the lines are subjected to pressure. The lines often pass through gate valves and sometimes valves of this type become out of order and do not open completely; the line may be dented, and where the line makes bends or turns the cross section is not circular but elliptical. Since the carrying capacity of the line is diminished by any departure from circular cross section, it is desirable to caliper the line occasionally in order to detect the presence of constrictions which are severe enough to reduce cross-sectional area and carrying capacity of the line.

Machines have been produced for such calipering service. These are drawn by a cable through relatively short sections of the line and caliper a number of diameters of the pipe by means of depressible members circumferentially spaced from each other around the internal wall of the pipeline. The extent of depression of the various members is recorded on a recorder carried by the instrument and the presence of the out-of-round or partially obstructed points within the section of line calipered are determined. However, machines of this type are expensive, slow and cumbersome in use, and the normal flow of fluid through the line cannot be maintained while the line is being calipered in this manner.

It is a principal object of this invention to provide a device for calipering the interior of a pipeline which makes it unnecessary to stop normal fluid flow through the line during the calipering operation.

Another object of the invention is to provide a device of this type which is simple and cheap in construction, fool-proof and can be operated by unskilled personnel.

Another object is to provide a pipeline calipering device which is impelled through the pipeline by normal flow of fluid therein.

Still another object is to provide a pipeline calipering device which is very rapid in operation and which is capable of being deformed to correspond to the cross-sectional area of the pipeline at a point where it is partially obstructed and which will remain in deformed state.

Another object of this invention is to provide a quick and easy process for the detection of a constriction in a pipeline while flow of fluid is maintained therethrough.

The present invention utilizes a pipeline pig comprising a body and a plurality of sealing cups disposed around the body in position to make sealing contact with the interior wall of a pipeline, and the whole to be impelled through the line by normal flow of fluid therethrough in the manner customary for batching pigs. A large number of sheets of easily deformed inelastic material, preferably a metal such as dead soft aluminum, lead, soft copper, soft pure iron, or other comparable metals, are attached to the body directly, or on a carrying drum attached to the body so that at least a large number of sheets have their outer peripheries spaced a short distance from the interior wall of the pipeline. It is preferred that these sheets are not large enough to make contact with the inner pipeline wall, but are spaced therefrom sufficiently to avoid being deformed by contact with welds joining sections of the pipeline, or by corroded spots and other minor obstructions on the interior of the wall, since these minor obstructions do not interfere seriously with the rate of flow obtainable through the pipeline.

In use, the calipering pig of this invention is inserted into an upstream end of the pipeline, or into a scraper trap using exactly the same technique which is used in the insertion of batching pigs or scraping pigs into the line.

The calipering pig is then propelled by flow of fluid in the line to a scraper trap downstream where it is removed. If an out-of-round section of pipeline, a sharp turn, a dent, a partially open gate valve, or other partial obstruction is encountered en route, the circular calipering plates are deformed as the pig passes these obstructions and because of their inelastic nature, they remain in the deformed position until the pig is removed from the downstream scraper trap. The presence of any partial obstruction in the line and also the extent of such obstruction is easily determined by observing the degree to which the calipering plates are deformed.

In the attached drawings, wherein like characters are used to designate like parts:

FIG. 1 illustrates one preferred type of pig embodying principles of this invention partly in section;

FIG. 2 is a vertical section through the device of FIG. 1 along the line 2—2 thereof;

FIG. 3 is a vertical section through the same device along the line 3—3, thereof, illustrating larger calipering sheets;

FIG. 4 is a vertical section through the same device along the line 4—4 thereof;

FIG. 5 shows a pig of the type shown in FIG. 1 passing through a pipeline and undergoing deformation contacted with a dent; and FIG. 6 shows the pig of the type shown in FIG. 1 undergoing deformation by a sharp turn in the pipeline.

The preferred type of pig, as illustrated in FIG. 1, comprises a cylindrical body designated generally as 10. Sealing members 11 are carried by the body 10 in position to make sealing contact with the inner wall of the pipeline and the outer periphery 12 of the sealing members. The body and the sealing members are longitudinally movable through a pipeline by the normal flow of fluid therethrough. Sealing members 11 preferably are disposed in two series; namely, a series near the leading end of the pig and a series near the rear of the pig in an arrangement common in batching pigs.

The body of the pig preferably is made up of a large number of annular spacing rings 13, the preferred construction of these rings being of aluminum or other strong light-weight material. A plurality of thin plates or sheets 14 of an easily deformable inelastic material such as dead soft aluminum, lead, soft copper, soft iron, or similar material are singly disposed between adjacent spacing rings. Sealing members 11, body members 13 and thin plates or sheets 14, have openings through them to receive throughbolts 15 having threaded end portions suitable to engage retaining nuts 16. Throughbolts 15 are spaced equidistant from each other upon the circumference of a circle, as best shown in FIGS. 2, 3 and 4, and are used in sufficient number to give rigidity to the body of the pig. A lifting connection 17, illustrated as a D-handle, is attached to the front end of the pig.

The thin plates or sheets of easily deformable inelastic material are arranged at least in two series wherein the plates are of different size. In the preferred device illustrated, the plates or sheets 14 are arranged in three series; namely, a series at the front end of the pig, a second series at the center of the pig, and a third series at the rear of the pig, while series of similar but larger thin plates or sheets 18 are arranged between each of the sealing members 11 in both series of sealing members. A plurality of diameters of deformable plates or sheets increase the ease of calculating the seriousness of a partial obstruction present in the pipeline as will be seen upon a consideration of FIGS. 5 and 6.

In FIG. 5, the reference numeral 21 illustrates a pig constructed as shown in FIG. 1, passing through a pipeline which is dented at 22 to an extent to form a serious constriction in the pipeline diameter and lessen the capacity to pass fluid therethrough. The direction of flow of fluid and motion of the pig is from right to left of the drawing. Consideration of this figure will show that the first series of plates 14 have been slightly deformed at their edges by contact with the peak of dent 22 in the pipeline. As the leading sealing member 11 was depressed by sliding over the peak of dent 22 in the pipeline, the series of large diameter plates 18 immediately following this member was depressed and very badly distorted. Because of the dead soft nature of the material from which these plates or sheets are constructed, they remain in distorted position. A larger plate 18a immediately in front of the leading member 11 has, of course, been deformed by contact with the peak of dent 22, but once past the point of contact, the normal elasticity of the leading sealing member 11 substantially restores sheet 18a to flatness. The soft nature of the material does not present sufficient resistance to cause the sealing members 11 to remain in permanently distorted shape.

FIG. 6 shows a pig of the type illustrated in FIG. 1 in use for measuring the sharpness of a bend in a pipeline 23. It will be observed that because of the sharpness of the particular bend shown, the sealing members 11a and 11b, namely, the leading member and the member next to the rear of the pig are distorted sufficiently at their tops to cause a slight deformation of the plates 18 immediately behind them, while there is no distortion of these particular plates 18 at the bottom of the pig.

The bottom of sealing members 11c and 11d, however, are deformed by contact with the interior wall of pipeline 23 and are bent back to slightly deform members 18 immediately behind them. The smaller plates 14 throughout the length of the pig are not deformed at all, but retain their original shape in passing around this sharp bend illustrated in FIG. 6.

The operation of the device as described above is believed to be obvious upon consideration of the descriptive drawings attached hereto. When it is desired to determine whether or not a partial obstruction has developed in a section of line, a pig of the type described and shown is substituted for one of the batching pigs used in normal pipeline service by inserting it into an upper end of the line or into an upstream scraper trap. The pig is propelled through the line by normal flow of fluid therein to a scraper trap downstream, and is retrieved by lifting it out of the scraper trap by inserting a hook into the lifting connection 17. If none of the plates 14 or 18 have been distorted by passage of the pig through the section of line tested, it is obvious that there is no serious obstruction in that section of line. If, on the other hand, there is distortion of the type shown in FIG. 6, it may be assumed that there is a sharp turn, possibly due to sagging of the line, and the radius of curvature of the sag may be estimated roughly from the degree of distortion observed.

When there is serious distortion, as shown in FIG. 5, the extent of the obstruction can be easily estimated by placing a straight edge along the distorted members 14 and measuring from the straight edge to the normal circumference of the pipeline. Thus, both the degree of obstruction and a general idea of its nature can be determined by examination of the deformed sheets or plates after the pig has passed through the section of line.

After examination of the pig of the preferred construction illustrated, the pig may be easily disassembled by removing retaining nuts 16 from throughbolts 15 and pulling the bolts out. The bent plates 14 or 18 may then be picked out of the pig and placed in a press for returning them to flatness. The pig may then be reassembled for future use.

It will be apparent that this pig has a high degree of utility in detecting partial obstructions in lines easily and quickly. When it has once been determined that there is an obstruction in a line between one scraper trap and another, or between other means for separating sections of line, a pipeline may be patrolled, or calipered by some other instrument to find the exact location of the constriction, thus avoiding the necessity for beginning at one end of the line and calipering the entire line carefully to find the obstruction. The passage of the pig of this invention when passed through consecutive sections of the line, quickly and easily determines which section should be investigated more thoroughly.

From the foregoing it will be seen that this invention is one well adapted to attain all of the ends and objects hereinabove set forth, together with other advantages which are obvious and which are inherent to the device and process.

It will be understood that certain features and subcombinations are of utility and may be employed without reference to other features and subcombinations of the invention. This is contemplated by and is within the scope of the claims.

As many possible embodiments may be made of the invention, without departure from the scope thereof, it is to be understood that all matter herein set forth or shown in the accompanying drawings is to be interpreted as illustrative and not in a limiting sense.

The invention having been described, what is claimed is:

1. A calipering pig comprising in combination an elongate body; a plurality of sealing members of elastic, easily deformable material carried by the body in position to seal between the body and a pipeline wall, said body being movable through the pipeline by pressure of fluid flowing through the line upon the body and sealing members; and a series of circular sheets of easily deformable, inelastic material of such size to extend from the body near to the pipeline wall carried by the body in spaced relationship to each other along the body and substantially parallel to the sealing members.

2. The pig of claim 1 wherein the sheets of easily deformable inelastic material are of soft metal.

3. The pig of claim 1 wherein the sheets of easily deformable inelastic material are of dead soft aluminum.

4. A calipering pig comprising in combination an elongate body composed of a plurality of annular spacing rings disposed transverse to the longitudinal axis of the body; a plurality of sealing members of elastic, easily deformable material carried by the body in position to seal between the body and a pipeline wall, said body being movable through the pipeline by pressure of fluid flowing through the line upon the body and sealing members; a series of circular sheets of easily deformable, inelastic material of such size to extend from the body near to the pipeline wall singly disposed substantially parallel to the sealing members between adjacent spacing rings; and means for holding the spacing rings and sheets therebetween firmly together.

5. The pig of claim 4 in which the means for holding the spacing rings and sheets firmly together is a plurality of throughbolts disposed through all spacing rings and sheets.

6. The pig of claim 4 in which the spacing rings are aluminum.

7. The pig of claim 4 in which the sheets of the easily deformable inelastic material are of dead soft aluminum.

8. A calipering pig comprising in combination an elongate body; a plurality of sealing members of elastic, easily deformable material carried by the body in position to seal between the body and a pipeline wall, said body being movable through the pipeline by pressure of fluid flowing through the line upon the body and sealing members; a plurality of series of circular sheets of easily deformable, inelastic material carried by the body, said circular sheets being spaced from each other along the body and substantially parallel to said sealing members, the sheets in at least one series being of such size to extend near to the pipeline wall and sheets in at least one series being of lesser size.

9. The pig of claim 7 in which the sheets of easily deformable inelastic material are sheets of soft metal.

10. The pig of claim 7 in which the sheets of easily deformable inelastic material are sheets of dead soft aluminum.

11. A calipering pig comprising in combination an elongate body; a series of sealing members of elastic, easily deformable material carried by the body in position to seal between the body and a pipeline wall near the front end of the body; a second series of such sealing members carried by the body in position to seal between the body and a pipeline wall near the rear end of the body, said body and sealing members being movable through the pipeline by pressure of fluid flowing through the line upon the body and seals; a series of circular sheets of easily deformable, inelastic material of such size to extend near to the pipeline wall disposed between adjacent sealing members in each series; and three series of such sheets of lesser size carried by the body, namely a first series carried by the body ahead of the leading sealing member of the leading series, a second series carried by the body between the series of sealing members near the front end of the body and a series carried by the body behind the rearmost sealing member of the rear series of sealing members, each of said circular sheets being disposed substantially parallel to the sealing members.

12. The pig of claim 11 in which the sheets of easily deformable inelastic material are of dead soft aluminum.

References Cited in the file of this patent

UNITED STATES PATENTS 1,936,828     Clement _____ Nov. 28, 1933